Oct. 21, 1924.
T. W. CAREY, JR
DEMONSTRATOR
Filed July 16, 1923
1,512,745
3 Sheets-Sheet 1
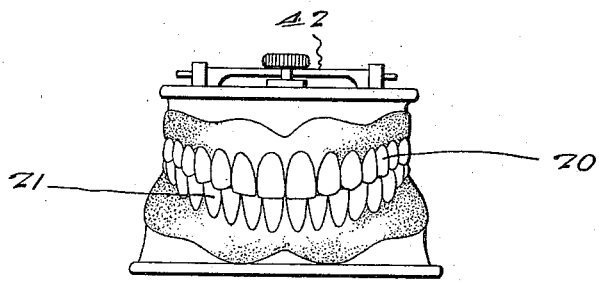
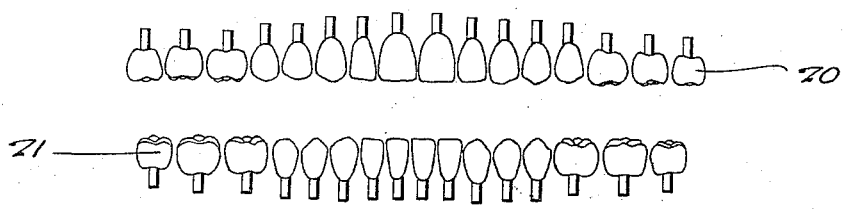
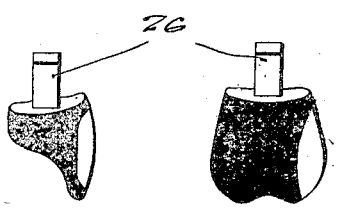
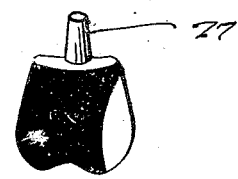

Oct. 21, 1924.  T. W. CAREY, JR  1,512,745
DEMONSTRATOR
Filed July 16, 1923  3 Sheets-Sheet 2

T. W. Carey, Jr. INVENTOR
BY Victor J. Evans
ATTORNEY

WITNESS:

Oct. 21, 1924.

T. W. CAREY, JR
DEMONSTRATOR
Filed July 16, 1923

WITNESS:

T. W. Carey, Jr.
INVENTOR

BY Victor J. Evans
ATTORNEY

Patented Oct. 21, 1924.

1,512,745

UNITED STATES PATENT OFFICE.

THOMAS W. CAREY, JR., OF NEW ORLEANS, LOUISIANA.

DEMONSTRATOR.

Application filed July 16, 1923. Serial No. 651,930.

*To all whom it may concern:*

Be it known that I, THOMAS W. CAREY, Jr., a citizen of the United States, residing at New Orleans, in the parish of Orleans and State of Louisiana, have invented new and useful Improvements in Demonstrators, of which the following is a specification.

This invention relates to demonstrating devices and has for an object the provision of means for displaying and demonstrating all kinds of dental work, such as fillings, crowns, bridge work, sets of teeth and so forth, the invention being especially useful in teaching dentistry and for illustrating, displaying and explaining to dental patients and others the character and forms of the proposed work and the differences between properly and improperly executed work, as well as providing means for producing an exact replica of a patient's mouth, to aid in explaining its condition and the character of the necessary work.

With the above and other objects in view, the invention further includes the following novel features and details of construction, to be hereinafter more fully described, illustrated in the accompanying drawings and pointed out in the appended claims.

In the drawings:—

Figure 1 is a view showing a full set of artificial teeth attached to an articulator, the teeth being arranged in accordance with the present invention.

Figure 2 is a view representing sixteen upper and sixteen lower teeth, the view illustrating the front of the bicuspids and molars.

Figure 5 is a detail perspective view of two of the teeth shown in Figure 4 and illustrating gold and white porcelain replacements.

Figure 6 is a similar view showing a modified form of attaching post.

Referring in detail to the drawings, like characters of reference denote corresponding parts throughout the several views.

In carrying out the invention there are provided separate reproductions of all of the different human teeth as illustrated in Figures 2 to 7 of the drawings, the teeth shown in Figure 2 and indicated at 20 representing teeth of the upper jaw, while those indicated at 21 represent teeth of the lower jaw and may be made of any suitable material and colored to represent various gold fillings, gold inlays and abutments for inlay work, the latter being illustrated by combining these teeth with any of the teeth desired. These gold fillings, inlays and so forth are shown solid black in Figures 4, 5, 6 and 7 of the drawings. Dental bridge work may also be illustrated by casting two or more teeth into forms to represent the right and left sides and the front of the teeth, which combined will form a full upper or lower bridge. Any number or combination of forms are possible for any kind or type of dental work, as will be later apparent.

Figure 3:
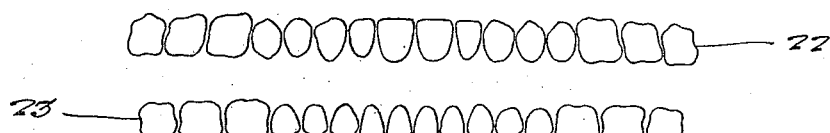
Figure 3 is a similar view illustrating the occlusal surfaces of these teeth.

The teeth shown in Figure 2 represent the front surfaces while the teeth 22 and 23, illustrated in Figure 3 of the drawings, represent the occlusal surfaces of the upper and lower teeth and like the teeth shown in Figure 2 are colored or made to represent gold fillings, gold inlays and so forth.

Figure 4:
Figure 4 illustrates a set of sixteen teeth illustrating different types of crowns or other replacements with porcelain and gold combination.
Figure 7:
Figure 7 illustrates a set of sixteen teeth having gold crowns.

The teeth illustrated at 24 in Figure 4 illustrate teeth provided for representing Richmond crowns upon face crowns or other replacements with porcelain and gold combinations, porcelain outside and gold inside. This is more clearly shown in Figure 5 of the drawings. The teeth shown at 25 in Figure 7 of the drawings represent gold crowns as used in capping teeth, so that by combining these and other teeth, any bridge forms are possible. They may be also used in illustrating gold crowns in the construction of plate work and so forth, by placing the teeth in the demonstrator and crowning or bridging the teeth to represent the desired character of the work.

Figure 8:
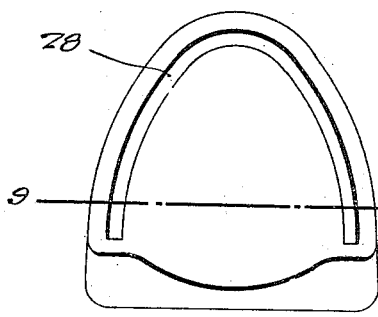
Figure 8 is a perspective view illustrating the base for the upper jaw.
Figure 9:
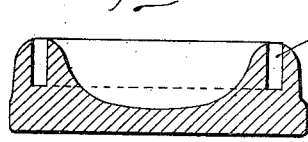
Figure 9 is a transverse sectional view on the line 9—9 of Figure 8.

All of the teeth used in the present invention are provided with posts 26 and 27 as shown in Figures 5 and 6 of the drawings. The posts 26 are transversely rectangular, while the posts 27 are round and may if desired be tapered. These posts provide means for removably and frictionally securing the teeth within a base as shown in Figures 8 to 11 and 13 to 15 of the drawings. The base shown in Figures 8 and 9 represents an upper jaw base and is provided with a groove 28 which is shaped to conform substantially to the arrangement of the teeth within a jaw and by inserting the posts 26 of the teeth within the groove 28, the particular character of the work to be done may be explained. That is, by selecting the proper teeth from the various sets illustrated and explained, so as to obtain the proper combinations and arrangement, the character of the proposed work may be demonstrated.

Figure 12:
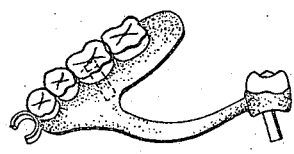
Figure 12 illustrates a form of upper arch bar.
Figure 10:
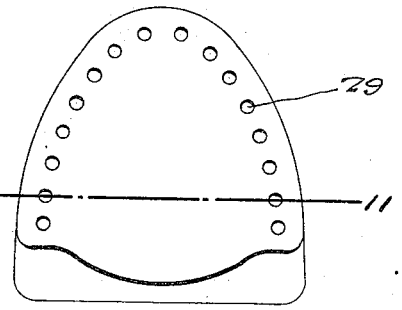
Figure 10 is a detail perspective view showing a modified form of upper jaw base.
Figure 11:
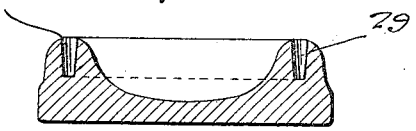
Figure 11 is a sectional view on the line 11—11 of Figure 10.

The form of post illustrated in Figure 6 is designed for use with the form of base shown in Figures 10 and 11. This base is provided with spaced openings 29 which receive the posts 27 and as the posts and openings are slightly tapered, the teeth will be frictionally held in place. The form shown in Figure 12 may also be used with this form of base and represents an upper arch bar set. Various types of these forms may be used.

Figure 13:
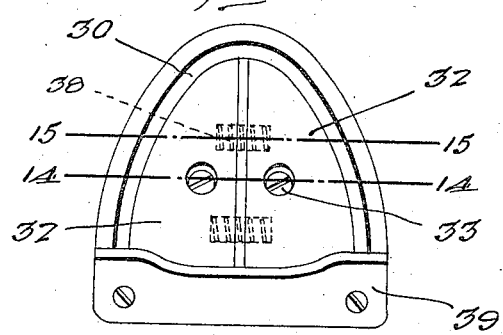
Figure 13 is a detail perspective view of a modified form of base.
Figure 14:
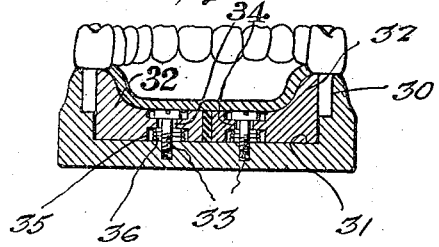
Figure 14 is a section on the line 14—14 of Figure 13.
Figure 15:
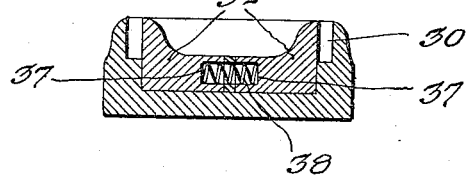
Figure 15 is a similar view on the line 15—15 of Figure 13.

In Figures 13, 14 and 15, there is illustrated another form of base in which the base receiving groove 30 has one of its walls of a yieldable character so as to provide surer frictional engagement with the base. For this purpose, the base is cut away as shown at 31 so as to provide a recess and seated within this recess are spaced blocks 32 of the shape shown. These blocks are preferably formed of elastic or compressible material and are capable of relative lateral movement, being held to the base by means of screws or fastening devices 33 which pass through openings 34 provided in said blocks, the said openings being of a character to permit of independent movement of the blocks. The outer ends of the openings 34 are enlarged to aid the heads of the screws 33, while the inner ends are also enlarged to provide sockets 35 for the reception of coiled springs 36, to take up lost motion. In order to urge the blocks in opposite directions they are provided with oppositely disposed sockets 37 in their opposed faces, which sockets receive the opposite ends of coiled springs 38. The ends of the groove 30 are closed by a removable plate 39.

Figure 16:
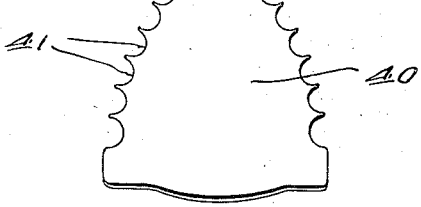
Figure 16 is a detail view of a face plate.

In Figure 16 there is illustrated a face plate 40 which is used upon the palatial or lingual side of the model and may be made of suitable material. This plate 40 is provided around its edges with notches 41 for the reception of the teeth and is preferably colored natural pink. These face plates are interchangeable and are fitted into position without interfering with the set up teeth on the base. The plates are made of various colors of vulcanite rubber, celluloid, gold plate, aluminum plate and so forth.

Figure 17:
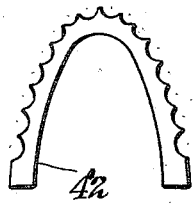
Figure 17 is a detail view of one of the teeth engaging strips.

The bases illustrated are for the upper jaw, but representations for the lower jaw may be similarly made, except that instead of the face plate 40, strips extend around the inner or lingual sides of the teeth, so that no center is provided. These strips are indicated in Figure 17 at 42 and are frictionally held in place.

It will be apparent from the foregoing description and accompanying drawings, that the invention provides means whereby any single tooth or combinations of teeth may be made up to show various types of dental work, form fillings to complete sets of teeth so as to illustrate for various purposes, different characters of dental work, the finished product or model being mounted upon an articulator 42 to provide for its proper demonstration.

The invention is susceptible of various changes in its form, proportions and minor details of construction and the right is herein reserved to make such changes as properly fall within the scope of the appended claims.

Having described the invention what is claimed is:—

1. Means for displaying dental work comprising a base, a plurality of artificial teeth, posts extending from the teeth, means included in the base for removably receiving the posts and laterally movable means providing a frictional engagement between the base and posts.

2. Means for displaying dental work comprising a base, a plurality of artificial teeth, posts extending from the teeth, means included in the base for removably receiving the posts and means including movable yieldable members for providing a frictional engagement between the base and posts.

3. Means for displaying dental work comprising a base having a slot therein shaped to conform to the configuration of a set of teeth, a plurality of artificial teeth, means carried by the teeth and adapted to be positioned within the slot and a yieldable wall for the slot to provide a frictional engagement with the teeth carried means.

4. Means for displaying dental work comprising a base, a plurality of artificial teeth and means including relatively movable spring actuated sections carried by the base for removably securing the artificial teeth in place, to provide various representations of dental work.

5. Means for displaying dental work comprising a grooved base, a marginal flange included in the base and defining one wall of the groove, relatively movable members carried by the base and defining the opposite wall of the groove, artificial teeth removably positioned within the groove and spring means for forcing the relatively movable members toward the flange to frictionally hold the teeth in position.

In testimony whereof I affix my signature.

THOMAS W. CAREY, Jr.